(12) United States Patent
Smith et al.

(10) Patent No.: US 12,137,301 B2
(45) Date of Patent: Nov. 5, 2024

(54) IDENTIFICATION OF SCREEN DISCREPANCY DURING MEETING

(71) Applicant: Lenovo (Singapore) Pte. Ltd., Singapore (SG)

(72) Inventors: Joshua Smith, Milton, FL (US); Matthew Fardig, Boonville, IN (US); Travis Ennis, Jasper, IN (US); Richard Downey, Charlestown, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 156 days.

(21) Appl. No.: 17/889,639

(22) Filed: Aug. 17, 2022

(65) Prior Publication Data

US 2024/0064269 A1 Feb. 22, 2024

(51) Int. Cl.
*H04N 7/14* (2006.01)
*H04L 12/18* (2006.01)
*H04N 7/15* (2006.01)

(52) U.S. Cl.
CPC ......... *H04N 7/147* (2013.01); *H04L 12/1818* (2013.01); *H04N 7/152* (2013.01)

(58) Field of Classification Search
CPC ..... H04N 7/147; H04N 7/152; H04L 12/1818
See application file for complete search history.

(56) References Cited

U.S. PATENT DOCUMENTS

| 11,082,661 | B1* | 8/2021 | Pollefeys | H04N 7/15 |
| 2012/0179465 | A1* | 7/2012 | Cox | G10L 15/26 |
| | | | | 704/235 |
| 2018/0077445 | A1* | 3/2018 | Puntambekar | H04N 21/84 |

* cited by examiner

*Primary Examiner* — Amal S Zenati
(74) *Attorney, Agent, or Firm* — FERENCE & ASSOCIATES LLC (57) ABSTRACT

One embodiment provides a method, the method including: detecting, during a meeting comprising at least one participant remote to a user identified as a presenter, communication data and visual data provided by the user to the at least one participant; determining, utilizing a meeting discrepancy system, that content of the visual data does not match content of the communication data; and providing, to the user and utilizing a meeting discrepancy system, a notification indicating the content of the visual data does not match the content of the communication data. Other aspects are claimed and described.

20 Claims, 3 Drawing Sheets

IDENTIFICATION OF SCREEN DISCREPANCY DURING MEETING

BACKGROUND

When presenting information, it is common practice for a presenter to accompany a verbal presentation with a visual aid. The visual aid may provide an attendee of the presentation with a clearer understanding of what a presenter is describing. Further, the visual aid may provide attendees with additional information regarding a subject being spoken on. As businesses, and other entities, move away from the traditional presentations towards a more modern approach utilizing technology to perform presentations remotely, applications, and other computer programs, are utilized to produce and, thereafter, provide visual aids to attendees of a meeting.

BRIEF SUMMARY

In summary, one aspect provides a method, the method including: detecting, during a meeting comprising at least one participant remote to a user identified as a presenter, communication data and visual data provided by the user to the at least one participant; determining, utilizing a meeting discrepancy system, that content of the visual data does not match content of the communication data; and providing, to the user and utilizing a meeting discrepancy system, a notification indicating the content of the visual data does not match the content of the communication data.

Another aspect provides a system, the system including: an information handling device including at least one sensor; a processor operatively coupled to the information handling device; a memory device that stores instructions that, when executed by the processor, causes the system to: detect, during a meeting comprising at least one participant remote to a user identified as a presenter, communication data and visual data provided by the user to the at least one participant; determine, utilizing a meeting discrepancy system, that content of the visual data does not match content of the communication data; and provide, to the user and utilizing a meeting discrepancy system, a notification indicating the content of the visual data does not match the content of the communication data.

A further aspect provides a product, the product including: a computer-readable storage device that stores executable code that, when executed by a processor, causes the product to: detect, during a meeting comprising at least one participant remote to a user identified as a presenter, communication data and visual data provided by the user to the at least one participant; determine, utilizing a meeting discrepancy system, that content of the visual data does not match content of the communication data; and provide, to the user and utilizing a meeting discrepancy system, a notification indicating the content of the visual data does not match the content of the communication data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 illustrates an example of information handling device circuitry.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a user is presenting to a group, whether in a meeting or another setting, the use of a visual aid can be provided to help explain the topic being discussed. As a user is presenting it is common practice that the presenter will not look at the visual aid and rather allow those in attendance to reference the visual aid while the user communicates the key points. This lack of viewing the visual aid while presenting may result in the user discussing a topic that is different from a topic presented visually, and because the user is not viewing the aid, may go unnoticed for an extended period of time.

Conventionally, when a user is discussing a topic that is different than a topic present on a visual aid, it falls on those in attendance to notify the user that the information does not align. This type of notifying can act as a disruption, and may further influence a user's ability to confidently continue presenting. Additionally, since those in attendance are commonly seeing the information that the user is presenting for the first time, uncertainty regarding the relevance of the visual aid to the information being communicated by the user is common. Thus, an attendee may never notify the user of the discrepancy with the visual aid. What is needed is a system and method that may determine when communication data being supplied from the user does not match the visual data and thereafter provide a notification to the user upon determining the discrepancy between the content.

Accordingly, the described system and method provides a technique for determining when the content of visual data matches the content of the communication data and providing a notification when the content of the visual data does not match the content of the communication data by utilizing a meeting discrepancy system. As a meeting is ongoing between at least one participant and a user identified as a presenter, the system may detect communication data and visual data provided by the user in the meeting. The meeting discrepancy system may then determine whether the content of the visual data being displayed to the at least one participant matches the communication data the user is supplying. When the meeting discrepancy system determines that the content of the visual data does not match the content of the communication data, the system may provide the user with a notification indicating that the content does not match. Such a method provides a user with assistance to ensure that the content of the visual data matches the content of the communication data, thereby, maximizing an understanding of the content provided by the user in the meeting.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
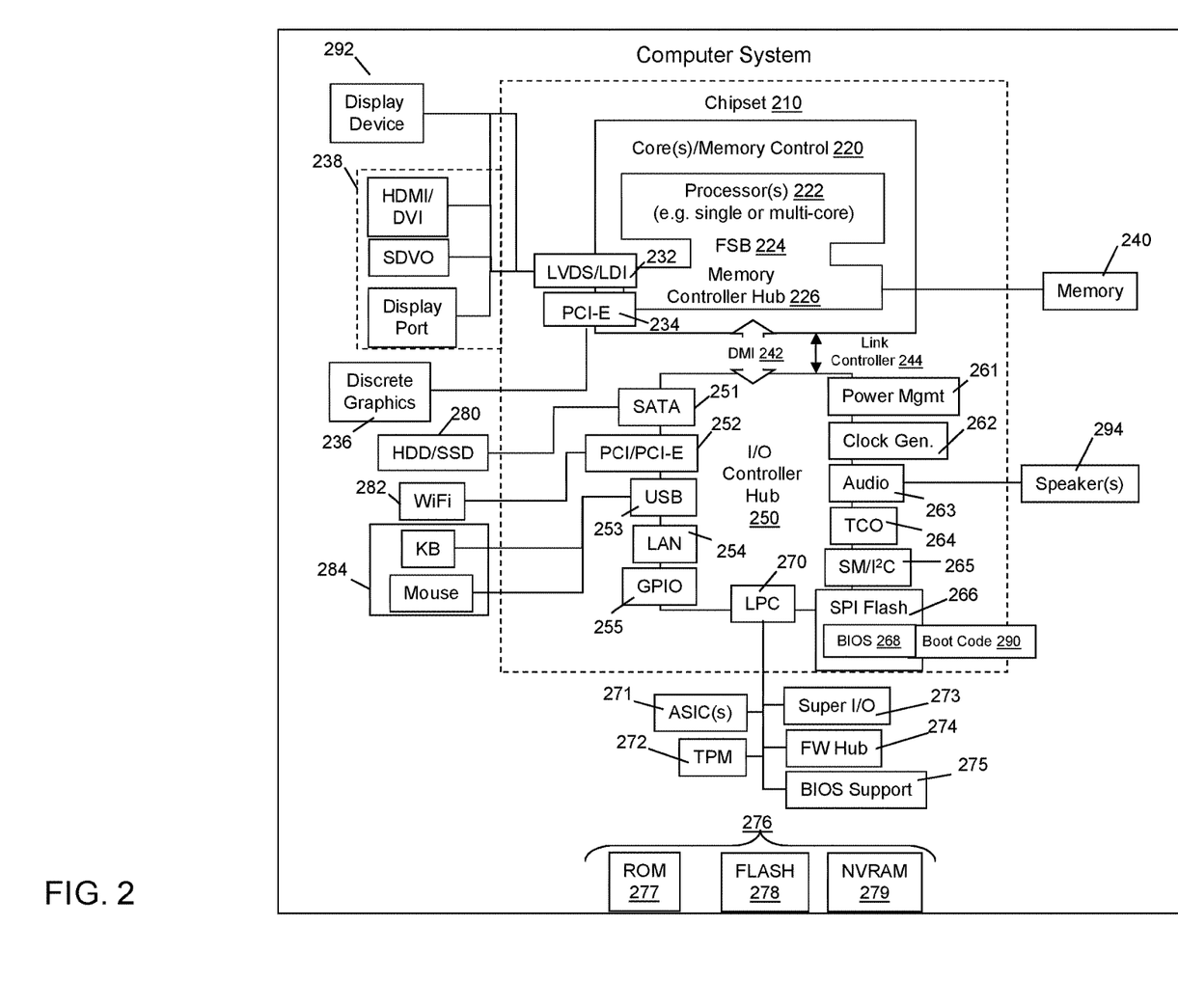
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that detect both visual and communication data and determines potential mismatches between the two content data types. For example, the circuitry outlined in FIG. 1 may be implemented in a tablet or smart phone embodiment, whereas the circuitry outlined in FIG. 2 may be implemented in a personal computer embodiment.

Figure 3:
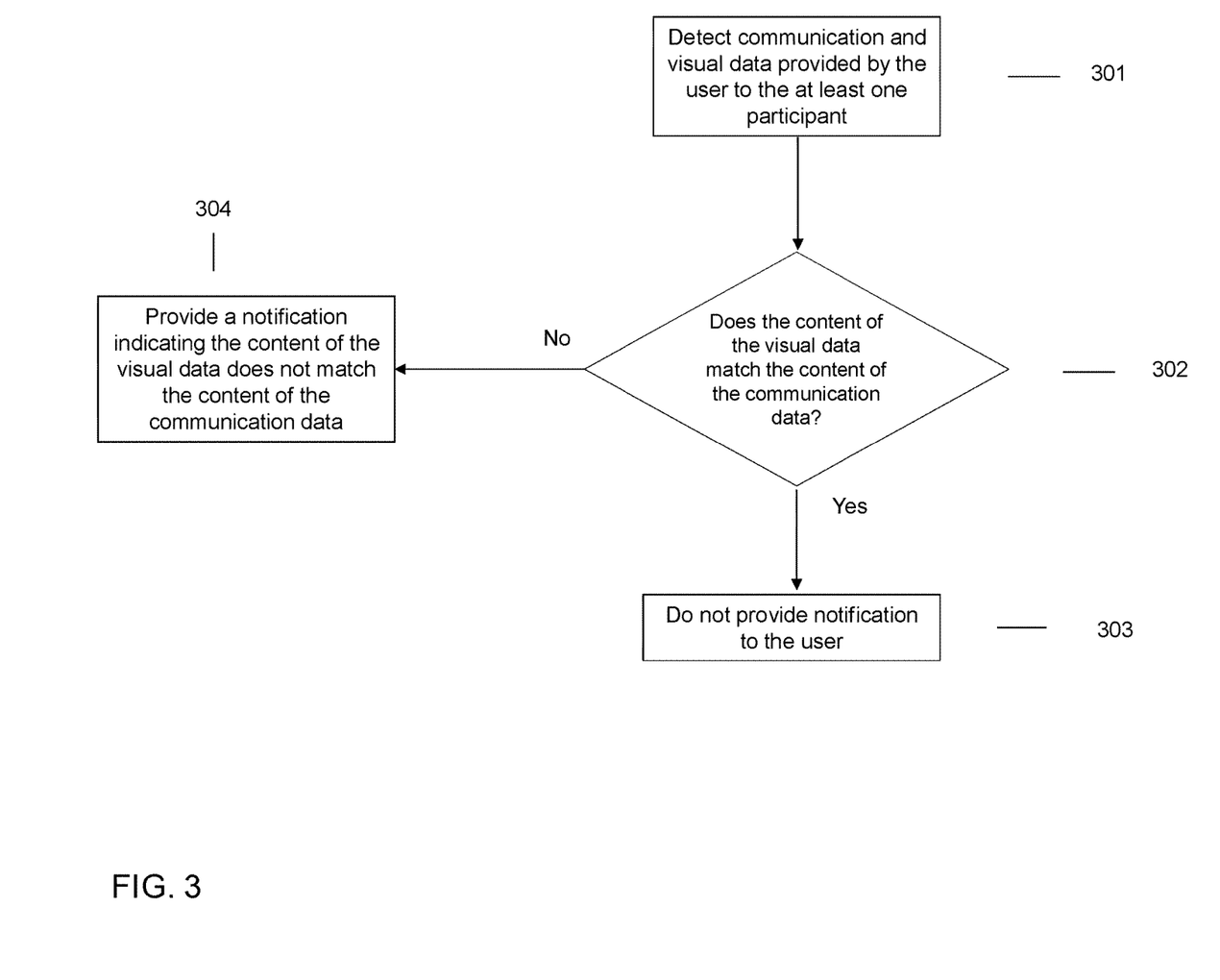
FIG. 3 illustrates an example method for determining if the content of shared visual data matches the content of shared communication data by use of a meeting discrepancy system.

FIG. 3 illustrates an example method for determining that content of the visual data does not match content of the communication data and providing a notification to the user based upon this determination. The method may be implemented on a system which includes a processor, memory device, image capture devices, audio capturing devices, and/or other components, for example, those discussed in connection with FIG. 1 and/or FIG. 2. While the system may include known hardware and software components and/or hardware and software components developed in the future, the system itself is specifically programmed to perform the functions as described herein to determine whether a match is present between the content of the visual data and the content of the communication data. Additionally, the meeting discrepancy system includes modules and features that are unique to the described system.

The meeting discrepancy system may be implemented on a single information handling device or a system of devices. Generally, the information handling device utilized by the user to participate in a meeting (e.g., virtual meeting) will be a traditional user device, for example, a smart phone, cellular phone, laptop computer, tablet, and/or other devices that have the ability to participate in a communication. Thus, the information handling device may include at least one processor permitting the utilization of the information handling device for accessing a communication medium between at least two participants present on a transmitted communication.

The meeting discrepancy system may run in the background of an information handling device and may be activated when the device is activated. Additionally, or alternatively, the system may be activated when an application associated with a communication-medium (e.g., video-conferencing application, remote conference application, etc.) is activated, detected, or otherwise opened. The system may also activate the system upon the detection of content associated with the visual data. In this case, the meeting discrepancy system may not be activated until the content of the visual data is provided.

Once the meeting discrepancy system is activated on a device, the system may be utilized throughout the process of determining a relationship between the content of the visual data and the content of the communication data and potentially providing a notification when the content types are identified as not matching. Continued use of the meeting discrepancy system in determining the relevance of the content of the visual data to the content of the communication data may train the device in determining a topic or content present in each of the content types, determining that the content data of the visual data does not match the content of the communication data, and/or the like, and thereafter, providing a notification to the user indicating the content data types do not match. In the performance of some steps, the meeting discrepancy system may utilize a neural network, machine-learning model, and/or other learning algorithm, collectively referred to as a machine-learning model for ease of readability. Machine-learning models may assist the meeting discrepancy system in accurately determining the relevance of the content of the visual data with the content of the communication data. The machine-learning model can be trained utilizing recorded communications previously parsed, and each of its parsed sections identifying the associated topic being discussed, the user or participant discussing the topic, and utilizing a content analysis technique for determining images and figures present in the content of the visual data provided. In other words, the machine-learning model is given annotated content associated with the visual data and communication data provided by the user where topics and/or content are already labeled or annotated. These annotated recorded communications are referred to as a training dataset.

Using the training dataset, which may change over time, the machine-learning model learns nuances between participants when presenting topics by use of visual data and communication data within a meeting. This results in more accurately identifying a relevance between the content of the visual data and the content of the communication data. For example, the machine-learning model can learn different terms used when initially beginning to discuss a topic, keywords commonly used by the user, terms indicating the conclusion of a topic discussion, and other keywords and/or terms a participant may utilize indicative of a piece of data for determining content of the communication data. The machine-learning model can learn different images and figures used when illustrating a topic, keywords and images regularly present within the content of the visual data and other keywords and/or figures/images that may be commonly utilized. As information is determined within new meetings between participants, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate At 301, during a meeting including at least one participant remote to a user identified as a presenter, the system may detect communication data and visual data provided by the user to the at least one participant. It should be noted that the user identified as a presenter may change throughout a meeting. Additionally, it should be noted that in a meeting a single user may provide, transmit, and control the visual data even if that user is not actively providing the communication or audible data. Thus, the presenter will be considered the person or user who is currently providing the communication or audible data.

The user and the at least one participant may access a meeting over a communication medium by use of a personal information handling device, and generally an information handling device or group of information handling devices that allow both audio data transmission/reception and visual data transmission/reception, for example, smart phone, laptop computer, personal computer, smart television, smart watch, cellular phone, a combination thereof, and/or the like. The communication medium (e.g., a video-conferencing application, remote conference application, screenshare application, etc.) may permit the sharing of audio or communication data (e.g., voice, music, etc.) and visual data (e.g., live-capturing of user/participant, visual content data, etc.) over the medium. This utilization of a communication medium further permits the presenting of information to occur in a single location. Rather than having to provide communication data over a separate program/application from the visual data, a communication medium minimizes potential communication issues when presenting content to at least one participant of the meeting.

However, it should be noted that the described meeting discrepancy system can be utilized with visual and communication data that are supplied over more than one application and/or device. For example, in some meetings a user may be designated as the user who will provide and control the visual data. Thus, the visual data may be provided by one user using an information handling device of that user or controlled by the user. However, another user may provide the communication or audible data using an information handling device of that user or controlled by that user. As another example, a user may provide communication data using a smart phone and a laptop computer to provide visual data. The meeting discrepancy system can be utilized in these types of meeting configuration that include multiple devices or applications to provide the meeting information.

Detecting the communication data, at 301, may include detecting audible communication data provided by the user identified as the presenter. Additionally, or alternatively, the communication data provided by the user may include received text describing a topic for presentation. Communication data is provided to describe the topic in which a user is presenting. In the system, when the communication data is considered to be appropriately provided, the topic and/or content present within the communication data provided by the user will coincide with the topic(s) and/or content illustrated in the content of the visual data, which is being described or discussed by the user. Throughout this application the communication data will be referred to as audible communication data. However, this is for example purposes and is not intended to narrow the communication data types potentially used in the system.

After detecting both the communication data provided by the presenter and the visual data described or discussed by the presenter, the meeting discrepancy system, at 302, may determine if the content of the visual data matches the content of the communication data. In other words, the meeting discrepancy system may determine if the communication data the user is currently providing matches the visual data currently being displayed to and viewed by the at least one participant of the meeting.

In determining whether a match exists between the content of the visual data and the content of the communication data, at 302, the meeting discrepancy system may utilize one or more of a variety of techniques. Collection of communication data provided by the user may include utilizing at least one sensor coupled to the information handling device of the user, for example, an audio capture device, an image capture device, and/or the like. In the system, when identifying the content or topic of the communication data, the meeting discrepancy system may utilize a natural language processing technique that can be used to parse and identify information contained within the communication data. For example, natural language processing techniques may include information extractors, parts-of-speech analyzers, semantic analysis, syntactic analysis, optical character recognition, entity identification techniques, and/or the like.

The meeting discrepancy system may additionally, or alternatively, utilize the machine-learning model to identify the topic of content of the communication data. The machine-learning model may be trained with annotated natural language information and may, therefore, be able to identify content or topics of the communication data using the trained model. Another machine-learning model may be trained with annotated communication data where the communication data is annotated with content or topics. Thus, this machine-learning model may make predictions regarding the topics and or content of the communication data without being trained on natural language information.

The meeting discrepancy system may also utilize secondary information sources in identifying topics and or content of the communication data. For example, the system may access a meeting agenda, meeting notes, user documents, Internet sources, combinations thereof, and/or the like, that may assist in identifying topics and or content that may be present in the communication data. Additionally, since different users may provide communication data differently, the system may identify the user providing the communication data, may be trained on communication data of a particular user, and/or the like. When identifying the topic(s) and/or content of the communication data, the system may assign a confidence value to the topic(s) and/or content. The confidence value identifies how certain the system is that the identified topic and/or content is actually the topic and/or content included in the communication data. The identified topic and/or content of the communication data may then be used when determining if a match exists between the content of the communication data and the content of the visual data.

The system may also determine, at 302 and by use of the meeting discrepancy system, the content of the visual data provided by the user to the at least one participant of a meeting. When determining the content of the visual data, the meeting discrepancy system may utilize a content analysis technique. Content analysis techniques may include image analysis techniques, text analysis techniques, image entity identification techniques, image correction techniques, and/or the like. The system may also utilize secondary information sources, for example, meeting agendas, user notes, Internet sources, a combination thereof, and/or the like.

The system may additionally, or alternatively, use one or more machine-learning models to identify topics and/or content included in the visual data. The machine-learning model(s) may be trained in content and/or image analysis techniques, using annotated visual data, and/or the like. In other words, the machine-learning model(s) used for content and/or topic identification in the visual data may be similar to the machine-learning model(s) used for content and/or topic identification in the communication data, except trained in different modalities of data.

Thus, the meeting discrepancy system, may determine, at 302, a topic associated with the content present in the visual data. For example, if the visual data includes the images of a shark, sword fish, and a clown fish, the meeting discrepancy system utilizing a content analysis technique may identify the topic as saltwater fish and/or fish found in the ocean. When identifying the content and/or topics of the visual data, the system may assign a confidence value to the determination of the topic(s) and/or content similarly to the confidence value of the communication data. determined topic of the content of visual data may then be compared to the topic of the content of the communication data in an attempt to identify a match between the two content data types.

The meeting discrepancy system may compare the topics and/or the content of the communication data and the topics and/or content of the visual data against one another, and based upon a determined level of similarity, the system will conclude if the communication data and the visual data being provided by the user are related. When comparing the topics of the content types, the meeting discrepancy system may determine a similarity confidence level for the similarity between the topics. The similarity confidence level may be based upon the confidence level of the topic identification of the communication and/or visual data. As an example, if the system has a low confidence level of a particular topic included in the communication and/or visual data, the similarity confidence level may be lower because the comparison is uncertain. Conversely, a high confidence in the topic(s) and/or content may result in a high similarity confidence. The similarity confidence may also not be dependent on the topic(s) and/or content confidence.

A threshold level for similarity and/or a match may be set, and whether the combination of the topics meets or exceeds the threshold level of similarity, the system will determine a relationship between the content of the communication data and the content of the visual data. In other words, if the threshold level of similarity is met or exceeded, the system may determine the visual and communication data match. If the threshold level of similarity is not met, the system may determine that the visual and communication data do not match or that there is a discrepancy between the visual and communication data. In the system, the threshold level of similarity may be a standard, preprogrammed level of certainty implemented by the producer of the communication medium. Additionally, or alternatively, the threshold level of certainty may be predetermined by the user. Additionally, or alternatively, the threshold level of certainty may be predetermined by the meeting discrepancy system, and thereafter adjusted by the system with continued use of the meeting discrepancy system.

Additionally, or alternatively, in the system, when determining, at 302, if the content of the visual data matches the content of the communication data, the meeting discrepancy system may utilize an application matching technique. In the system, the application matching technique may determine, at 302, if and/or when a user mentions an application in use during the supplying of the communication data to the at least one participant. Upon determining that the communication data includes reference to an application as described as being in use, the meeting discrepancy system may track the application providing the visual data and determine if the application providing the visual data is using the described application. When it is determined that the application in use when supplying the visual data is not the same as the application the user mentions when supplying the content data, the system will determine, at 302, that a match does not exist between the content of the visual data and the content of the communication data.

Additionally, or alternatively, when determining, at 302, if the content of the visual data matches the content of the communication data, the meeting discrepancy system may track the disclosing of a visual element in the communication data, and based upon the determined presence of the visual element in the visual data, the system may determine if a match exists between the content of the communication and the content of the visual data. For example, if the communication data discloses that a shark is allegedly present on the visual data being currently being supplied over the meeting, and there is not a shark on within the visual data, the meeting discrepancy system will determine, at 302, that there is not a match between the content of the visual data and the content of the communication data.

When it is determined, at 302, that the content of the communication data does match the content of the visual data, the user may continue on presenting without notification and/or interruption, at 303. However, when it is determined, at 302, that the content of the visual data does not match the content of the communication data, the meeting discrepancy system may provide to the user, at 304, a notification indicating that the content of the visual data does not match the content of the communication data.

Providing the user with a notification indicating a match between the content types does not exist prompts the user to change the content of the visual data to align with the content of the communication data being discussed. For example, when the system utilizes an application matching technique, and determines that the user is speaking on visual data present in an application that is not in use, the meeting discrepancy system may provide a notification to the user indicating that the visual data currently being provided does not coincide with the communication data, and thereafter, prompts the user to select the correct application. In the system, this provision of a notification to the user, at 304, is not intended to disrupt the user presenting. Rather than providing a notification to stop a user immediately, the meeting discrepancy system may provide an indication in a subtle form, notifying the user that the incorrect visual data is being supplied. For example, the user may receive a text bubble and/or message on their display indicating that the incorrect visual data is being supplied. To prevent further disruption, the notification may be only provided to the presenter or the person controlling the visual data and not to other participants of the meeting.

Further, the providing a notification, at 304, may include suggesting an application window to replace the visual data. In other words, when the visual data contains multiple pieces, and after determining that a match does not exist between the content of the visual data and the content of the communication data, the meeting discrepancy system may suggest the correct piece of visual data to supply over the meeting.

Additionally, or alternatively, in the system, when utilizing the meeting discrepancy system to provide the user with a notification indicating the content does not match, at 304, a notification may be supplied, and the meeting discrepancy system may determine what piece of content of the visual data is should be displayed. After this determination, the meeting discrepancy system may automatically adjust the visual data being supplied to the at least one participant. Rather than prompting and waiting for a user to select the correct visual data, determining the correct visual data and automatically adjusting the visual data to the correct visual data will further alleviate potential disruptions while a user is presenting.

The various embodiments described herein thus represent a technical improvement to conventional methods for determining matches between content of visual data supplied by the user and content of communication data supplied by the user by use of a meeting discrepancy system. Determining that a match exists between the visual data and the content data permits a user to keep on presenting; however, when determining that a match does not exist between the visual data and the content data, the meeting discrepancy system may provide the user with a notification indicating that content does not match. Rather than relying on traditional methods for being notified by an attendee of a meeting upon determination of lack of matching between the content types, the meeting discrepancy system determines when the content of the visual data matches the content of the communication in real time. When it is determined that a match does not exist, the meeting discrepancy systems notifies the user of a correction needed.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, during a meeting comprising at least one participant remote to a user identified as a presenter, communication data and visual data provided by the user to the at least one participant;
   determining, utilizing a meeting discrepancy system, that content of the visual data does not match content of the communication data, wherein the determining comprises:
      identifying the content of the visual data and assigning a confidence value to the visual data;
      identifying the content of the communication data and assigning a confidence value to the communication data; and
      comparing the content of the visual data and the content of the communication data against one another producing a similarity confidence level, wherein the similarity confidence level falls below a threshold level of similarity; and
   providing, to the user and utilizing a meeting discrepancy system, a notification indicating the content of the visual data does not match the content of the communication data.

2. The method of claim 1, wherein the communication data comprises audible communication data.

3. The method of claim 1, wherein the determining comprises utilizing a machine-learning technique.

4. The method of claim 1, wherein the determining comprises identifying the content of the communication data utilizing a natural language processing technique.

5. The method of claim 1, wherein the determining comprises identifying the content of the visual data utilizing a content analysis technique.

6. The method of claim 1, wherein the determining that the information displayed over the virtual meeting does not match the communication data is based upon determining a threshold value of certainty.

7. The method of claim 1, wherein the determining that the information displayed over the virtual meeting does not match the communication data comprises determining, utilizing an application matching technique, the content of the communication data does not match an application included in the visual data.

8. The method of claim 1, wherein the determining comprises identifying a topic of the visual data and a topic of the communication data.

9. The method of claim 1, wherein the determining comprises identifying a visual element discussed in the communication data and determining the visual element is not included in the visual data.

10. The method of claim 1, wherein the providing comprises suggesting an application window to replace the visual data.

11. An information handling device, the information handling device comprising:
- a processor;
- a memory device that stores instructions that when executed by the processor causes the information handling device to:
- detect, during a meeting comprising at least one participant remote to a user identified as a presenter, communication data and visual data provided by the suer to the at least one participant;
- determine, utilizing a meeting discrepancy system, that content of the visual data does not match content of the communication data, wherein the determining comprises:
  - identifying the content of the visual data and assigning a confidence value to the visual data;
  - identifying the content of the communication data and assigning a confidence value to the communication data; and
  - comparing the content of the visual data and the content of the communication data against one another producing a similarity confidence level, wherein the similarity confidence level falls below a threshold level of similarity; and
- provide, to the user and utilizing a meeting discrepancy system, a notification indicating the content of the visual data does not match the content of the communication data.

12. The information handling device of claim 11, wherein the communication data comprises audible communication data.

13. The information handling device of claim 11, wherein the determining comprises utilizing a machine-learning technique.

14. The information handling device of claim 11, wherein the determining comprises identifying the content of the communication data utilizing a natural language processing technique.

15. The information handling device of claim 11, wherein the determining comprises identifying the content of the visual data utilizing a content analysis technique.

16. The information handling device of claim 11, wherein the determining that the information displayed over the virtual meeting does not match the communication data is based upon determining a threshold value of certainty.

17. The information handling device of claim 11, wherein the determining that the information displayed over the virtual meeting does not match the communication data comprises determining, utilizing an application matching technique, the content of the communication data does not match an application included in the visual data.

18. The information handling device of claim 11, wherein the determining comprises identifying a topic of the visual data and a topic of the communication data.

19. The method of claim 1, wherein the providing comprises suggesting an application window to replace the visual data.

20. A product, the product comprising:
- a computer-readable storage device that stores executable code that, when executed by the processor, causes the product to:
- detect, during a meeting comprising at least one participant remote to a user identified as a presenter, communication data and visual data provided by the suer to the at least one participant;
- determine, utilizing a meeting discrepancy system, that content of the visual data does not match content of the communication data, wherein the determining comprises:
  - identifying the content of the visual data and assigning a confidence value to the visual data;
  - identifying the content of the communication data and assigning a confidence value to the communication data; and
  - comparing the content of the visual data and the content of the communication data against one another producing a similarity confidence level, wherein the similarity confidence level falls below a threshold level of similarity; and
- provide, to the user and utilizing a meeting discrepancy system, a notification indicating the content of the visual data does not match the content of the communication data.

* * * * *